US008514978B2

(12) United States Patent
Wertz et al.

(10) Patent No.: US 8,514,978 B2
(45) Date of Patent: Aug. 20, 2013

(54) CALIBRATION SYSTEM AND METHOD

(75) Inventors: Daniel S. Wertz, Sebastopol, CA (US);
Charles L. Corley, II, Santa Rosa, CA (US); Kunal H. Patel, Austin, TX (US)

(73) Assignee: National Instruments Corporation, Austin, TX (US)

( * ) Notice: Subject to any disclaimer, the term of this patent is extended or adjusted under 35 U.S.C. 154(b) by 366 days.

(21) Appl. No.: 12/976,638

(22) Filed: Dec. 22, 2010

(65) Prior Publication Data

US 2012/0027063 A1    Feb. 2, 2012

Related U.S. Application Data

(60) Provisional application No. 61/369,500, filed on Jul. 30, 2010.

(51) Int. Cl.
*H04L 27/00* (2006.01)

(52) U.S. Cl.
USPC ........... 375/316; 375/224; 375/225; 375/226; 375/227; 375/228; 375/354; 375/359

(58) Field of Classification Search
USPC ................. 375/316, 224, 225, 226, 227, 228, 375/354, 359
See application file for complete search history.

(56) References Cited

U.S. PATENT DOCUMENTS

| 3,963,871 | A * | 6/1976 | Thyselius et al. | 370/299 |
| 7,315,791 | B2 * | 1/2008 | Ilic et al. | 702/125 |
| 7,437,589 | B2 * | 10/2008 | Le et al. | 713/400 |
| 7,555,091 | B1 * | 6/2009 | Lewicki et al. | 375/376 |
| 8,265,484 | B2 * | 9/2012 | Boyd et al. | 398/74 |
| 2004/0034491 | A1 * | 2/2004 | Kim | 702/79 |
| 2004/0064750 | A1 * | 4/2004 | Conway | 713/401 |

OTHER PUBLICATIONS

"Measurement of Group Delay using the 6840 series Microwave System Analyzer with Option 22." Aeroflex App. Note, Jun. 2004. (pp. 1-12).
Vifian, Hugo. "Group Delay and AM-to-PM Measurement Techniques." Hewlet Packard Network Measurements Division, Santa Rosa, CA. Mar. 1982. (pp. 1-32).
Woods, Graham et al. "Improving Group Delay Measurement Accuracy using the FM Envelope Delay Technique." avaialble prior to Jul. 29, 2010. (pp. 1-6).
"National Instruments T-Clock Technology for Timing and Synchronization of Modular Instruments." Feb. 23, 2010. (pp. 1-15).
"Group delay and phase delay." Wikipedia, Jul. 30, 2010. (pp. 1-4).

\* cited by examiner

*Primary Examiner* — Kenneth Lam
(74) *Attorney, Agent, or Firm* — Meyertons Hood Kivlin Kowert & Goetzel, P.C.; Jeffrey C. Hood

(57) ABSTRACT

Receiving a modulated carrier signal that is modulated using a reference signal, wherein an acquisition by a digitizer is synced to the reference signal such that the modulated carrier signal has known timing with respect to a start of an acquisition within the digitizer. Further including routing the modulated carrier signal through a receiver system to generate a processed signal, receiving the processed signal at the digitizer, digitizing the processed signal at the digitizer, and determining a delay of the modulated carrier signal routed through the receiver system based on the timing of the processed signal.

74 Claims, 5 Drawing Sheets

CALIBRATION SYSTEM AND METHOD

PRIORITY

This application claims benefit of priority to U.S. Provisional Patent Application Ser. No. 61/369,500, entitled "Calibration System And Method", filed Jul. 30, 2010, by Daniel S. Wertz et al., which is hereby incorporated by reference in its entirety as though fully and completely set forth herein.

BACKGROUND OF THE INVENTION

1. Field of the Invention

This invention relates to calibration techniques, and more particularly to systems and methods for phase response self-calibration of instrumentation.

2. Description of the Related Art

Signal components are delayed when passing through a device such as communications receiver or similar instrumentation. The signal delay is often different for different frequencies. The delay variation means that signals consisting of different frequency components suffer delay (or time) distortion. Group delay is a measure of time distortion, and is typically calculated by differentiating the insertion phase response of the device under test (DUT) versus frequency.

In some instances calibration techniques are employed to account for delay, thereby helping to improve phase linearity of a device. With regard to communications receivers, phase linearity, as well as flat magnitude response, across an analysis bandwidth (BW) may be critical to prevent or minimize distortion of received signals. With regard to modular devices/instrumentation, such as those including a plurality of modular components that are combined to perform various functions, the performance of the modular components in combination and, thus, the performance of the measurement system as a whole, is often is difficult to predict, making it difficult to calibrate the system. With respect to modular devices/instrumentation, such as modular receivers, it may be necessary, or at least desirable, to quickly and accurately characterize (e.g., calibrate) a system, including characterizing delay after components of the system are exchanged or the interconnection cabling is modified. Unfortunately, for a given system or device, such as a communications receiver, phase response is typically characterized at the factory, using expensive and bulky test equipment. It may, thus, be impractical to calibrate the system or device on a regular basis. For example, it may be difficult or impractical to calibrate modular component systems in the field as configurations are modified, such as when components of the system are exchanged or the interconnection cabling is modified.

SUMMARY

Described herein are embodiments relating to a system and method for characterizing the phase response of a device/instrument, such as a communications receiver. In some embodiments, provided is a method for receiving, at a receiver system, a modulated carrier signal, wherein the carrier signal is modulated using a reference signal, and wherein an acquisition by a digitizer is synced to the reference signal such that the modulated carrier signal has known timing with respect to the start of an acquisition within the digitizer. The method also including routing the modulated carrier signal through the receiver system to generate a processed signal, receiving the processed signal at the digitizer, digitizing the processed signal at the digitizer, and determining a delay of the modulated carrier signal routed through the receiver system based on the timing of the processed signal.

In some embodiments, provided is a system that includes a receiver system to: receive a modulated a carrier signal, wherein the carrier signal is modulated using a reference signal, and wherein an acquisition by a digitizer is synced to the reference signal such that the modulated carrier signal has known timing with respect to a start of an acquisition within the digitizer and to route the modulated carrier signal through the receiver system to generate a processed signal. The system also includes the digitizer to: receive the processed signal, digitize the processed signal, and determine a delay of the modulated carrier signal routed through the receiver system based on the timing of the processed signal.

In some embodiments, provided is a computer readable storage medium having program instruction stored thereon, wherein the program instructions are executable by a computer to cause: receiving, at a receiver system, a modulated carrier signal, wherein the carrier signal is modulated using a reference signal, and wherein an acquisition by a digitizer is synced to the reference signal such that the modulated carrier signal has known timing with respect to a start of an acquisition within the digitizer. The program instruction further causing routing the modulated carrier signal through a receiver system to generate a processed signal, receiving the processed signal at the digitizer, digitizing the processed signal at the digitizer, and determining a delay of the modulated carrier signal routed through the receiver system based on the timing of the processed signal.

In some embodiments, provided is a system that includes a downconverter receiver system to modulate a carrier signal generated from an onboard signal source of the downconverter receiver system and route the modulated carrier signal through a receiver device of the downconverter receiver system to generate a processed signal. The carrier signal is modulated using a reference signal provided from a digitizer such that the modulated carrier signal has known timing with respect to a start of an acquisition within the digitizer. The digitizer to receive the processed signal, digitize the processed signal and determine a delay of the modulated carrier signal routed through the downconverter receiver system based on the timing of the processed signal.

In some embodiments, provided is a system including a digitizer to provide a reference signal to a downconverter receiver system. The downconverter receiver system is to modulate a carrier signal generated from an onboard signal source of the downconverter receiver system and route the modulated carrier signal through a receiver device of the downconverter receiver system to generate a processed signal. The carrier signal is modulated using the reference signal provided from the digitizer such that the modulated carrier signal has known timing with respect to a start of an acquisition within the digitizer. The digitizer further able to receive the processed signal, digitize the processed signal, and determine a delay of the modulated carrier signal routed through the downconverter receiver system based on the timing of the processed signal.

BRIEF DESCRIPTION OF THE DRAWINGS

A better understanding of the present invention can be obtained when the following detailed description of the preferred embodiment is considered in conjunction with the following drawings, in which.

Figure 1:
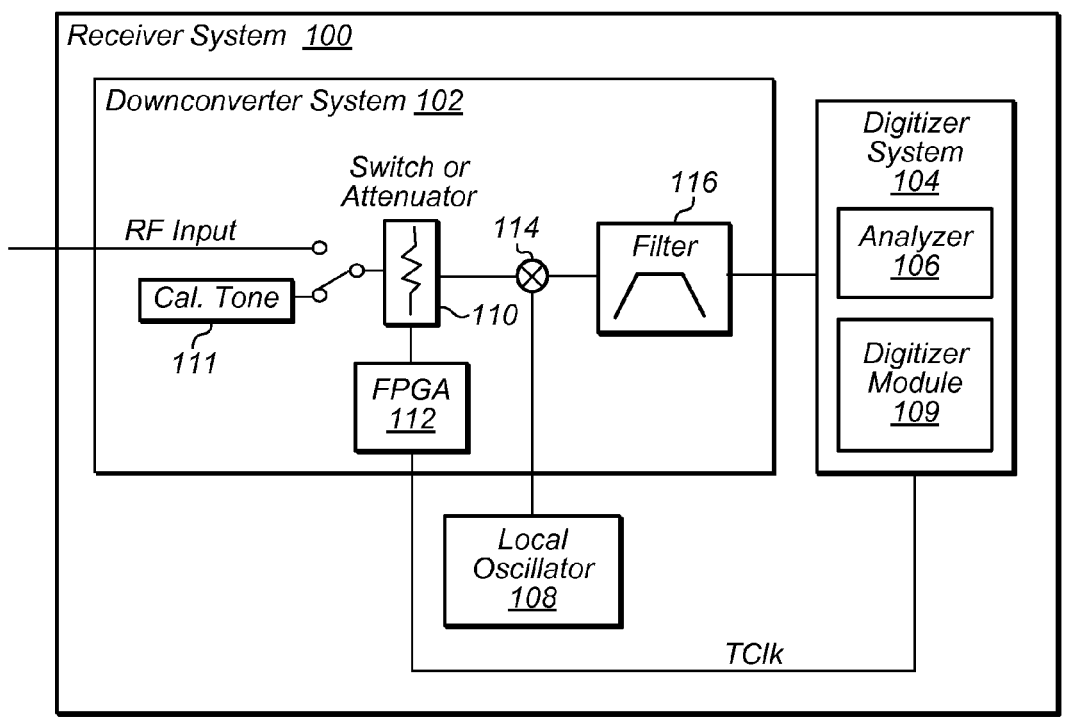
FIG. 1 is a diagram that illustrates a receiver system in accordance with one or more embodiments of the present technique.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (e.g., having the potential to, being able to), not a mandatory sense (e.g., must).

DETAILED DESCRIPTION

In the following description, numerous specific details are set forth to provide a thorough understanding of embodiments of the present invention. However, one having ordinary skill in the art should recognize that the invention may be practiced without these specific details. In some instances, well-known circuits, structures, and techniques have not been shown in detail to avoid obscuring the present invention.

Sample clock—is a signal that controls the timing of the analog-to-digital and digital-to-analog conversions performed by the ADC's of digitizers and DAC's on signal generators. The sample clock is also the signal that controls the rate at which digital waveforms are acquired or generated on digital pattern generators/analyzers. The sample clock is most often a periodic signal, derived from a crystal oscillator on the device. Various crystal oscillator technologies include voltage-controlled crystal oscillators (VCXOs), temperature-controlled crystal oscillators (TCXOs), and ovencontrolled crystal oscillators (OCXOs).

Reference clock—is a signal that may be used as a reference for timing by other devices. Many instruments contain phase-lock loops (PLLs). A PLL can lock the frequency of its output to a reference clock at its input. In instruments, a common reference clock frequency is 10 MHz, although many instruments allow a variety of reference-clock frequencies. The output of the PLL is typically the sample clock. Using a PLL, the sample clock frequency can be locked to the reference clock frequency. Therefore the absolute frequency accuracy of the sample clock may be identical to the frequency accuracy of the reference clock.

Trigger signals are signals that are used to trigger the occurrence of events to control data acquisition at the highest level. External events or triggers are the main methodologies for initiating an acquisition and generation. Triggers come in different forms, including analog, digital, and software.

Master and Slave Devices—When creating synchronized measurement systems, you typically designate one device as a master and one or more other devices as slaves. The master device is the device that generates a signal or signals used to control all the measurement devices in the system. The slave devices receive control signals from the master device.

As discussed in more detail below, described herein are embodiments relating to systems and methods of characterizing the phase response of a device/instrument, such as a communications receiver. In certain embodiments, the described techniques include characterization of the phase response of a receiver using simple and low cost hardware that can easily be included as an integral calibration system within the receiver. In some embodiments, the phase response characterization of the entire receiver, includes calibration across the radio frequency (RF), intermediate frequency (IF) and baseband sections. In certain embodiments, the phase response characterization includes the Analog to Digital Converter (ADC) of the receiver. In some embodiments, characterization of the system may not require external equipment typically available at a factory or similar calibration facility, and, thus, characterization of the system may be accomplished at any time (e.g., in the field as the system configuration is modified). In some embodiments, characterization is accomplished using an onboard calibration signal. In certain embodiments, modulation delay measurement techniques are employed using a shared synchronization signal (e.g., a TClk signal) available within a modular system to measure the phase response of a receiver system. In some embodiments, the phase response information is used to design an equalization filter to linearize the receiver system. In certain embodiments, the distortion within the receiver system is compensated for during use by implementing the equalization filter. In some embodiments, amplitude measurements may be acquired at the same time as delay measurements used to determine the phase response such that both magnitude and phase response of the receiver may be obtained simultaneously. In some embodiments, digitized data indicative of a received RF signal may be adjusted in accordance with the equalization filter to provide adjusted data that accounts for the observed/characterized delays of downconversion across various frequencies. Thus, a receiver system may provide accurate digitized data that is an accurate representation of input RF signal due to application of an equalization filter that was generated based on a self-calibration routine using a calibration signal provided from an onboard calibration signal source and the synchronization of the modulation of the calibration signal with the timing of an acquisition of the digitizer system via a shared clock signal (e.g., TClk).

FIG. 1 is a diagram that illustrates a receiver system 100 in accordance with one or more embodiments of the present technique. In some embodiments, receiver system 100 includes a downconverter system 102, a digitizer system 104, an analyzer 106 and a local oscillator 108. In some embodiments, receiver system 100 includes NI-5665 modular RF vector signal analyzer manufactured by National Instruments Corporation, having headquarters in Austin, Tex. In some embodiments, downconverter system 102 may be a NI-5603 modular wideband RF downconverter module, digitizer system 104 may be an NI-5622 modular intermediate frequency (IF) digitizer module with onboard signal processing (OSP) and/or local oscillator 108 may include an NI-5653 modular synthesizer/local oscillator (LO) source, capable of generating continuous-wave (CW) frequencies. Each of the above described modules being manufactured by National Instruments Corporation. Analyzer 106 may include an integral module of receiver system 100. For example, analyzer 106 may be integrated within digitizer system 104. In some embodiments, analyzer 106 may include a separate module located elsewhere within a respective test/measurement system including receiver 100.

As depicted, in some embodiments, downconverter system 102 may include an external radio frequency (RF) input and a calibration tone provided onboard. In some embodiments, the calibration tone is generated from an onboard calibration signal source device 111 integrated within in receiver system 100 and/or downconverter system 102. Such an embodiment may enable self-calibration based on the calibration signal generated onboard, without the need for an external calibration source to be provided. Thus, receiver system 100 may be calibrated in the field without the need for an external calibration signal to be provided. In some embodiments, the calibration tone may be provided from an external source. The external RF Input may include a path for receiving a raw RF signal that is to be downcovnerted by downconveter system 102. During use, either of the RF Input or the calibration tone signals may be routed to a switch/attenuator 110 coupled to a field-programmable gate array (FPGA) 112. The FPGA may be provided a shared trigger clock (TClk) signal from digitizer system 104. An output of the switch/attenuator may be forwarded to other portions of downconverter system 102, such as downconverter 114 and/or filter 116 for additional processing (e.g., conditioning/filtering). Downconverter 114 may operate based on timing signals provided by local oscillator 108 to provide a signal that is a downconversion of the modulated signal output from switch/attenuator 110. An output of the downconverter 114 may be filtered at filter 116 and the processed signal then output to digitizer system 104 for additional signal processing. In some embodiments, the processed signal is digitized via digitizer module 109 of digitizer system 104. Digitizer module may include an ADC to generate digital data representation of the analog processed signal received from downconverter system 102. As described below, during calibration, the calibration tone may be used (e.g., passed to the switch/attenuator) as opposed to the external RF input.

In some embodiments, receiver system 100 component modules (system 102-108) are calibrated independently and cabling and mismatch effects will result in some degree of residual error. The undesired effects, however, may be determined and accounted for through self-calibration (or internal calibration) described herein. In addition, drifts in system performance due to temperature change or aging can be effectively reduced by performing self-calibration. Self-calibration may not rely on external standards (e.g., an external RF signal), but may instead, adjusts the receiver system 100 component modules with respect to an onboard, high-precision voltage source (e.g., a calibration tone of down converter system 102). In some embodiments, self-calibration may be performed whenever there has been a physical change to any of receiver system 100 components or to the system cabling and/or whenever receiver system 100 is in an environment where external variables, such as temperature, can affect measurements.

In some embodiments, receiver system 100 may include a highly stable reference frequency and power source. During self-calibration, the reference source may be measured, and the resulting measurement results can be compared to a value stored in a memory (e.g., EPROM) of receiver system 100. The difference between the measured and stored value may be used to improve system performance.

Figure 2:
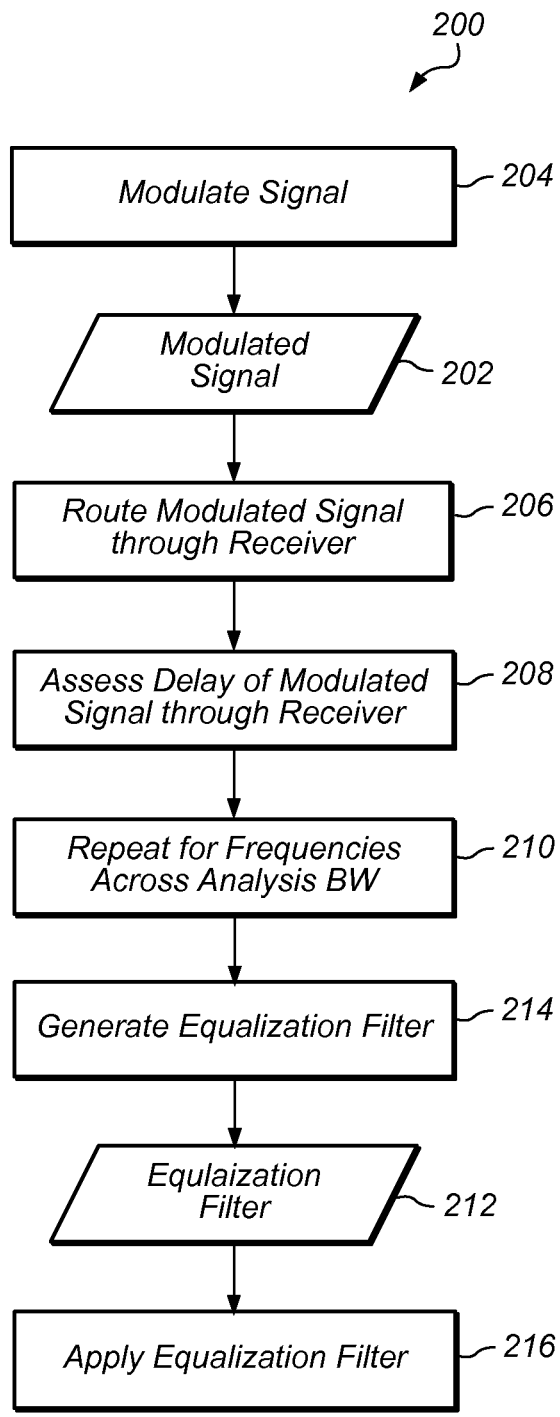
FIG. 2 is a flowcharts that illustrates a method of calibration in accordance with one or more embodiments of the present technique.

FIG. 2 is a flowchart that illustrates a method of calibration 200 in accordance with one or more embodiments of the present technique. In the illustrated embodiment, method 200 generally includes modulating a carrier signal (e.g., a calibration source/tone of down converter system 102), routing the modulated signal through a receiver, assessing the delay of the modulated signal through the receiver, repeating the modulation and assessment of delay across multiple frequencies across an analysis bandwidth (BW) of the receiver, generating an equalization filter based on the assessed delay for the frequencies, and applying the equalization filter to compensate for distortion.

In some embodiments, method 200 includes modulating a signal to generate a modulated signal 202, as depicted at block 204. Modulation signal 202 may have a fixed or known timing relationship with the digitizer start of acquisition. Modulating a signal may include applying a narrow band modulation to an RF carrier signal. The modulation may be any kind of modulation that has an information bandwidth that is small when compared with the analysis bandwidth. In some embodiments, modulating an RF carrier signal includes implementing amplitude modulation (AM modulation). In some embodiments, any constant amplitude signal can be used as the carrier signal. AM modulation may include AM modulating a signal with a switch or digital step attenuator. AM modulation may provide for a square-wave AM modulation scheme. AM modulation may be implemented using hardware present in downconverter system 102. In some embodiments, a calibration tone present in downconverter system 102 may be used for the carrier signal. The calibration tone may be a tone of downcovnerter system 102 that is normally used as a reference for amplitude calibration methods. In some embodiments, the calibration tone may be provided from an external source to downconverter system 102.

In some embodiments, modulating signal 202 may be provided from an external source other than the downconverter. In such an embodiment, the modulation signal may be generated external to the downconverter and routed from the external source to the downconverter. For example, a modulated RF signal may be provided via the RF input of downconverter system 102. The externally provided modulated signal may have a fixed or known timing relationship with the digitizer start of acquisition. In some embodiments, the digitizer could be triggered with the modulating signal. In some embodiments, the digitizer may be slaved to the modulating signal.

The carrier signal may be modulated using a reference signal such that the modulated carrier signal has known timing with respect to the reference signal. In some embodiments, a timing/sync reference signal (e.g., the same signal or multiple signals having the same or substantially the same timing) may be provided to both of the modulator of the carrier signal and a measurement device (e.g., a digitizer) such that both the modulator and the measurement device can be sync to the same reference signal, thereby enabling them to have a synchronized/fixed/known timing with respect to one another. In some embodiments, the timing/sync signal may be provided from an external source, from within receiver system 100, downconverter system 102 or digitizer 104. In some embodiments, the carrier signal is modulated using a reference signal provided from digitizer system 104 such that the modulated carrier signal has known timing with respect to the start of an acquisition within digitizer system 104. This may enable an accurate measurement of any delay of the modulated signal as it propagates through receiver system 100 to digitizer 104, as described herein.

In some embodiments, the modulation signal is derived from a signal provided by digitizer system 104. For example, the modulating signal may be derived from the digitizer sample rate. In some embodiments, the modulation signal may be derived from a trigger clock (TClk) signal provided by digitizer system 104, thereby providing for TClk synchronization between downconverter system 102 and digitizer system 104. TClk signals may include signals such as those disclosed in U.S. Pat. No. 7,315,791 by Ilic et al., issued Jan. 1, 2008, which is hereby incorporated by reference. By sharing the TClk signal, the modulation of calibration source (e.g., downconverter system 102) may have a known timing with respect to the start of a corresponding acquisition in digitizer module system 104.

TClk synchronization may be employed to have devices respond to triggers at the same time. The "same time" may mean on the same sample period and having very tight alignment of the sample clocks. TClk synchronization may be accomplished by having each device generate a trigger clock (TClk) that is derived from the sample clock. Triggers may be synchronized to a TClk pulse. A device that receives a trigger signal from an external source or generates the trigger signal internally may send the signal to all devices, including itself, on a falling edge of TClk. All devices may react to the trigger on the following rising edge of TClk. The TClk frequency may be much lower than the sample clock and/or a PXI 10 MHz reference clock to accommodate the instance where the propagation delay may extend to several nanoseconds. The TClk frequency may be manually set in some embodiments.

In some embodiments, the carrier signal may be modulated in sync with a sample rate of digitizer system 104. In some embodiments, the modulation may be a divided-down clock derived from the digitizer's sample clock. The modulation may be synchronized with digitizer system 104 starting collection of a measurement. In some embodiments, an amplitude modulated (AM) pulse burst commences a fixed number of samples after a first point in a digitizer trace is collected. In some embodiments, downconverter system 102 may cycle one of its attenuators (e.g., attenuator 110) on-and-off in sync to the digitizer sample rate (e.g., based on the digitizer's sample clock) to create an AM modulated signal. In some embodiments, downconverter system 102 may not have a clock that is synchronized to a sample rate of digitizer system 104. Digitizer system 104 may be configured to export a divided-down sample clock (TClk) (e.g., over backplane trigger (RTSI) lines between modules). In some embodiments, the exported sample clock may include a 50% duty cycle. In some embodiments, downconverter system 102 may receive the exported sample clock signal at FPGA 112.

In some embodiments, the attenuator switches or other modulation device (e.g., attenuator 110) control inputs are directly or indirectly attached and controlled from FPGA pins. This may allow the FPGA's outputs to directly modulate the signal using this connection to the modulation device.

In some embodiments, the attenuator switches or other modulation device (e.g., attenuator 110) are not attached directly to FPGA pins, but are located on another location in the module which can only be accessed over a serial peripheral interface (SPI) bus or any other type of single or multi-device control bus where the modulation device's control input(s) are not directly or exclusively connected to the FPGA's output pins or a buffered version of those signals. The control bus may not be normally run in synchronization with the digitizer clock. In some embodiments, the FPGA may include a clock-crossing synchronized status bit version of the clock that digitizer system 104 sends to the downconverter system 102. This may enable the clock edges of this clock to be detected by state machines or other program-driven digital hardware so that a flexible program can be used to generate the patterns used to control the modulation signal. The chip select or other activation signal that actually clocks the control bus data into the modulation device control interface may be synchronized to the clock sent from the digitizer in order to decrease or eliminate jitter in the modulated signal that might be caused by using an unsynchronized control bus clock. In some embodiments, a clock synchronized to a clock of the digitizer may be used to activate the modulation write operations in order to eliminate jitter in the generation of AM modulation pulses inside the down converter.

In some embodiments, a state machine such as a Register Access List (RAL) state machine may write to the SPI or other control bus attenuator address. A simple program like the 6-line pseudo-program below may be run on the RAL when this modulation is enabled:

1. Poll digitizer clock status bit and wait here until clock status bit is low (in order to establish an initial state).
2. Poll digitizer clock status bit and wait here until clock status bit is high (in order to detect and synchronize the program to a positive clock edge).
3. Write pattern to SPI bus to turn attenuator "off".
4. Poll digitizer clock status bit and wait here until clock status bit is low.
5. Write pattern to SPI bus to turn attenuator "on".
6. Loop to #2.

Because the RAL and the SPI or other type of control bus state machine may not run on the same clock as the clock sent by digitizer system 104, these SPI writes may not be perfectly in sync with the digitizer sample clock. However this state machine may only load the data into the SPI shift registers (e.g., before a clock edge occurs). Actual writes from the shift register to the output lines that control the attenuator may be triggered by the chip select line, which may be modified to be in sync with the digitizer clock. When the RAL program and the SPI state machine finish their shift register operations before the chip select line is pulsed, the correct data will be shifted in at exactly the correct time in sync with the digitizer clock.

While this AM modulation mode is in operation, it may not be possible to access or modify the downconverter's internal SPI or other control bus that control the RF and IF board registers. AM modulation mode may have to be disabled and the normal SPI operation enabled again for normal IF and RF board access to occur.

In some embodiments, method 200 includes routing the modulated signal through the receiver, as depicted at block 206. Routing the modulated signal through a receiver may include routing modulated signal 204 (e.g., the modulated calibration source/tone) through downconverter system 102 and/or portions of digitizer system 104. In some embodiments, the modulated signal may be routed through downconverter 114 to generate a signal that is a downconversion of the modulated signal provided to downconverter 114. In some embodiments, the downconverted signal may be provided to filter 116. Digitizer system 104 may digitize the modulated signal 204 to generate a set of digitized data representative of modulated signal 204. In some embodiments, a delay may be associated with downconverter 114, the filter 116, and/or portions of downconverter system 104 (e.g., digitizer module 109) such that the modulated signal encounters a delay as it is routed through downconverter system 102 to analyzer 106 and/or other portions of digitizer system 104.

In some embodiments, method 200 includes assessing delay of the modulated/processed signal through the receiver, as depicted at block 208. In some embodiments, assessing delay of the modulated signal through the receiver may include analyzer 106 analyzing digitized data (e.g., the digitized data representing at least a portion of the modulated signal) provided by digitizer system 104 to determine the timing of the resulting modulation with respect to the start of the acquisition. Assessing the delay of the modulated/processed signal may include determining the delay the modulated/processed signal experiences as it passes through receiver system 100 (e.g., due to modulation and/or signal processing), for the given frequency of the modulated signal 204 (e.g., the modulated calibration source). In some embodiments, determining a delay of the modulation signal includes analyzing digitized data generated by digitizing the modulated/processed carrier signal at digitizer system 104, and determining the timing of modulation/processing with respect to the start of data acquisition at digitizer system 104. Thus, the delay the modulated/processed signal experiences as it passes through system 100 can be directly determined.

In some embodiments, method 200 includes repeating one or more of the previously discussed method steps for frequencies across an analysis bandwidth, as depicted at block 210. Repeating one or more of the previously discussed method steps for frequencies across an analysis bandwidth may include setting the calibration source/tone to a different frequency and repeating the steps of modulating the signal (204) routing the modulated/processed signal through the receiver (206), and assessing the delay of the modulated/processed signal through the receiver (208), for the respective frequency. In some embodiments, the method steps (204-208) are repeated for a plurality of frequencies across an analysis bandwidth of the device of interest. For example, method steps (204-208) may be repeated to sweep a number of frequencies across the analysis bandwidth of receiver 100/downconverter system 102 to assess the delay of the modulated/processed signal for each of the respective frequencies of the source/tone signal.

In some embodiments, method 200 includes generating an equalization filter 212, as depicted at block 214. Generating an equalization filter 212 may include designing an equalization filter that effectively compensates for distortion due to constant delays observed during assessing the delay of the modulated/processed signal through the receiver at block 208. Typically, the delay (e.g., observed at block 208) will change as a function of the frequency of the calibration source (e.g., the modulated signal). In some embodiments, a delay vs. frequency relationship (e.g., curve) may be determined based on the observed delays at the various frequencies (e.g., the frequencies across the analysis bandwidth). A phase vs. frequency relationship (e.g., curve) may be determined as an integral of the delay vs. frequency curve. In some embodiments, the delay curve with respect to frequency is integrated to obtain the phase vs. frequency curve. In some embodiments, an equalization filter is designed based on the resulting phase vs. frequency curve. In some embodiments, method 200 includes apply the equalization filter, as depicted at block 216. Apply the equalization filter may include implementing the resulting equalization filter within receiver system 100 (e.g., by digitizer system 104 and/or within processing software) to account for delays (e.g., group delays) within system 100. For example, the equalization filter may be implemented in software to adjust the signals received to account for delays identified during assessment of the delay of the modulated/processed signal across the various frequencies. In some embodiments, the digitized data may be adjusted in accordance with the equalization filter to provide adjusted data that accounts for the observed delay across the various frequencies. Thus, receiver system 100 may provide accurate digitized data that is an accurate representation of input RF signal due to application of an equalization filter that was generated based on a self-calibration routine using a calibration signal provided from an onboard calibration signal source and the synchronization of the modulation of the calibration signal with the timing of an acquisition of the digitizer system via a shared clock signal (e.g., TClk).

In some embodiments, amplitude measurements are taken in coordination with the above described delay measurements (e.g., delay assessed at block 208), thereby enabling the determination of both magnitude response and phase response. For example, amplitude measurements may be taken at the same time as the delay measurements such that the magnitude and phase response of the entire downconverter system 102/digitizer system 104 signal path can be assessed and determined in a single calibration. Such a response may account for RF mismatch effects due to combining actual modules with actual cables being used.

Figure 3A:
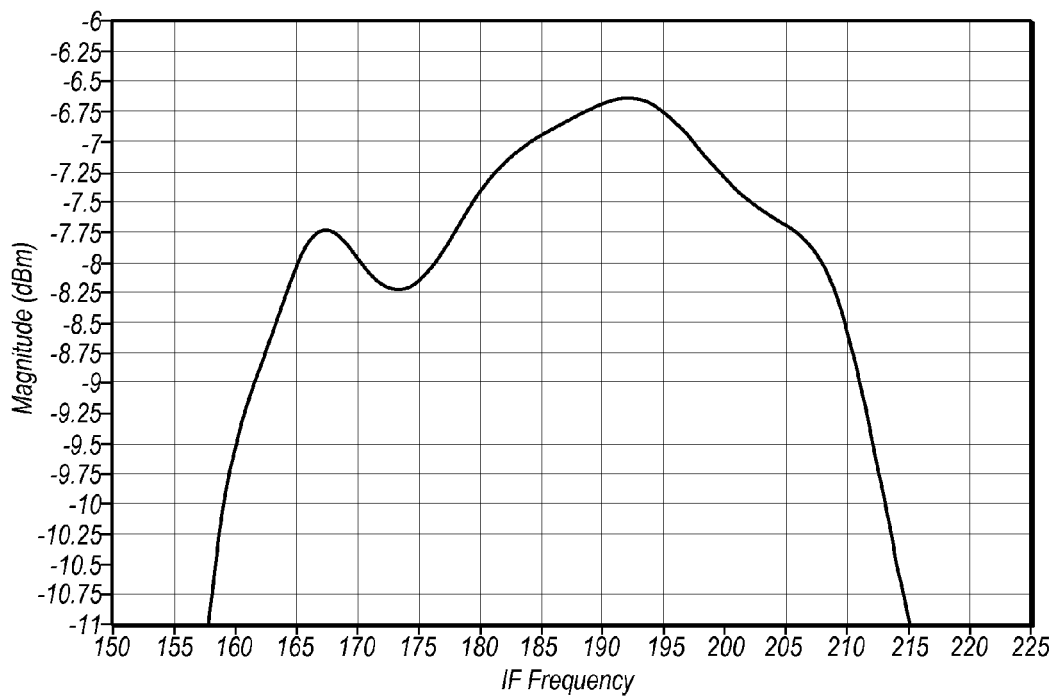
FIGS. 3A-3C are graphs that illustrate exemplary results of a calibration/measurement routine in accordance with one or more embodiments of the present technique.
Figure 3B:
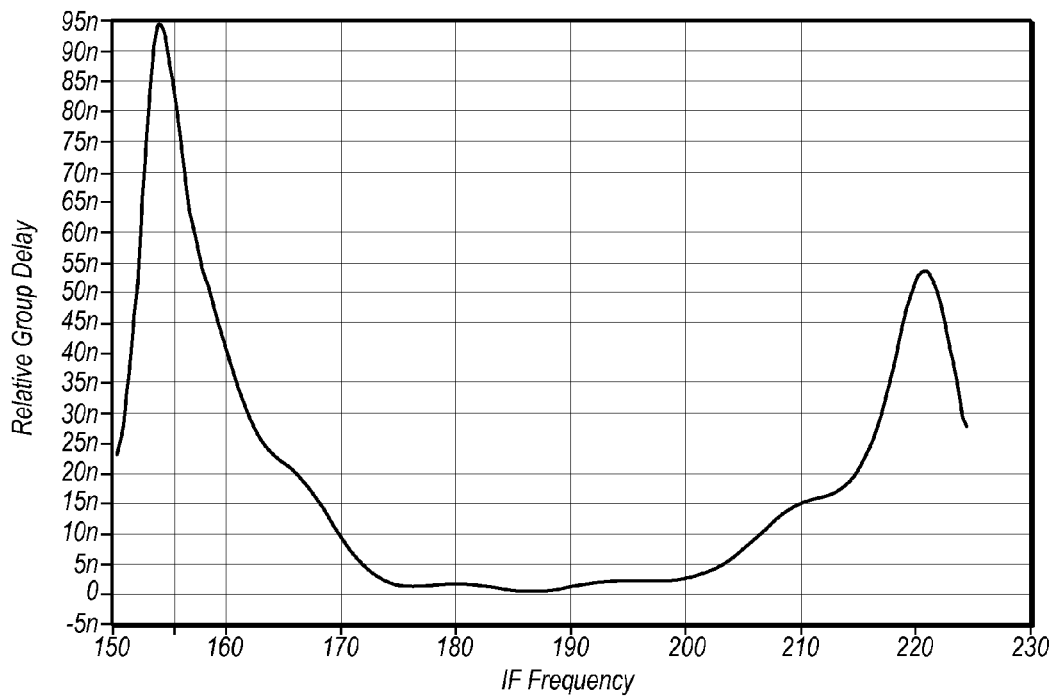
Figure 3C:
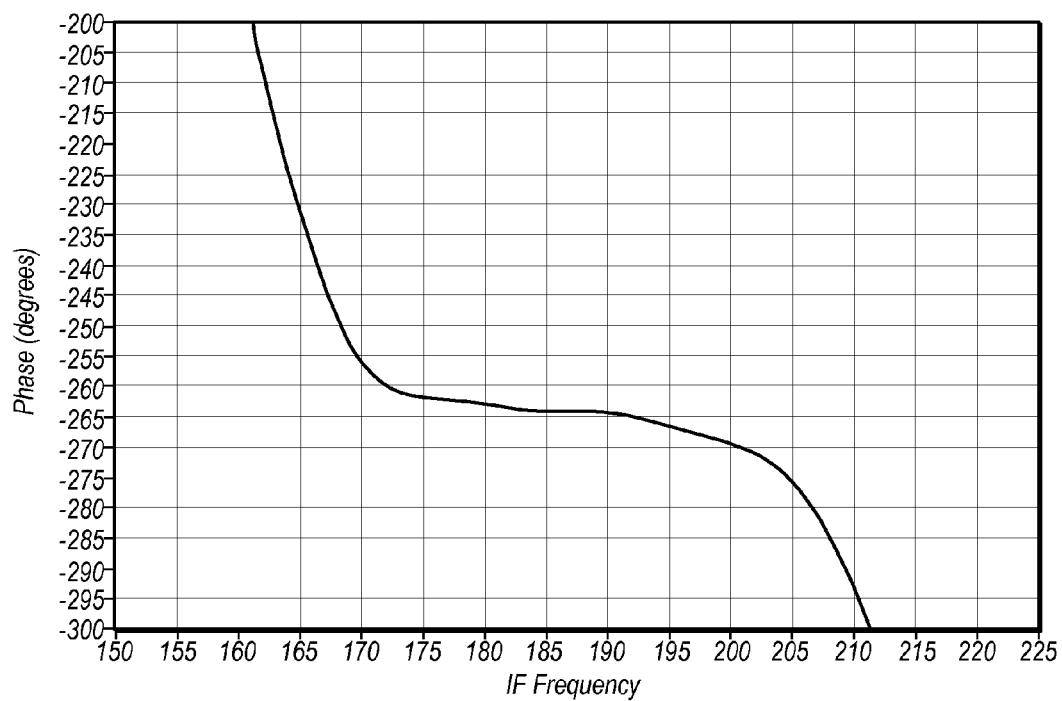

FIGS. 3A-3C are graphs that illustrate exemplary results of a calibration/measurement routine in accordance with one or more embodiments of the present technique. FIG. 3A is a graph that depicts a 50 megahertz (MHz) magnitude response. FIG. 3A is a graph that depicts a 50 MHz group delay measurement. FIG. 3A is a graph that depicts a 50 MHz phase response.

It will be appreciated that the above described method 200 is illustrative. Other embodiments may include various modifications and alterations that still fall within the scope of the contemplated embodiments. For example, one or more method steps may be rearranged such that the method is employed in a different order than described herein. Further certain steps may be removed repeated or added to the described method 200.

Figure 4:
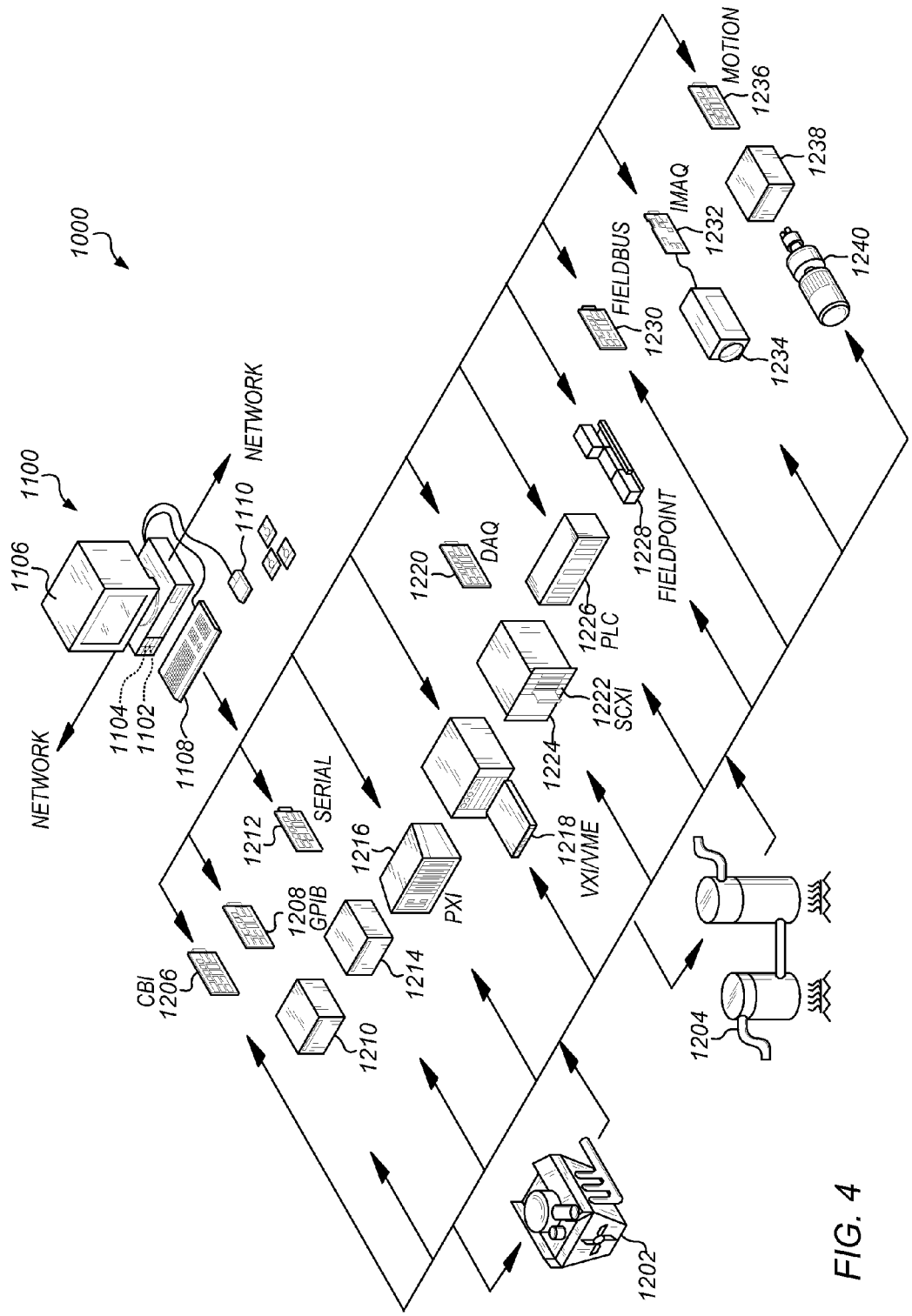
FIG. 4 is diagram of an exemplary computer system in accordance with one or more embodiments of the present technique.

In some embodiments, the above techniques may be implemented within a receiver system provided within a test and measurement/control system. FIG. 4 is a diagram that illustrates an exemplary test and measurement/control system ("computer system") 1000 in accordance with one or more embodiments of the present technique. One or more portions of computer system 1000 may be used implement one or more embodiments of the present technique. Computer system 1000 may include various combinations of hardware and software that include devices that can be used to implement various computer based processes.

In the illustrated embodiment, computer system 1000 includes a host computer system 1100. Host computer system 1100 may be operable to execute computer programs/routines that provide various computer related functions, such as those for implementing routines for testing a relay/switch matrix as described herein. For example, instructions for implementing the techniques described herein may be stored an executed by one or more of the computer systems/device of computer system 1000, such as host computer system 1100. Moreover, receiver system 100 may be implemented with one or more modular instruments provided within system 1000. Host computer system 1100 may include various components such as central processing unit (CPU) 1system 102 and a memory medium 1system 104. Memory medium 1system 104 may include a tangible non-transitory computer readable storage medium, such as random access memory (RAM), flash memory, hard-drives, and/or CD-ROMs, or the like. Memory medium 1system 104 may have program instructions stored thereon that are executable (e.g., by CPU 1system 102) to implement one or more computer implemented methods, such as those for implementing routines for calibration as described herein. In the illustrated embodiment, host computer system 1100 includes a display device (e.g., a monitor) 1106, an alphanumeric input device (e.g., a keyboard) 1108, and a directional input device (e.g., a mouse) 1110. In some embodiments, host computer system 1100 may include modular and/or plug-in boards/cards (e.g., with either commercially available or proprietary hardware) that may be added via a number of expansion slots internal or external to the computer body. For example, host computer system 1100 may include PCI/PCI Express slots and PCI/PCI Express cards disposed therein. As described in more detail below, host computer system 1100 may be connected to one or more devices, such as an expansion chassis for connecting to a various number and combination of devices. In certain embodiments, host computer system 1100 and/or other portions of computer system 1000 may be connected to one or more other devices via a network, such as an internal network (e.g., a local area network (LAN)) and/or an external network (e.g., the internet). In certain embodiments, host computer system 1100 may be used for various input/output (I/O) functions and processing tasks. For example, host computer system 1100 may be used for data acquisition (DAQ) (e.g., when a DAQ digitizing board is installed in computer 1100 or a device coupled thereto, such as a chassis, and associated software is run).

Host computer system 1100 may be configured to connect/communicate with other instruments/devices of computer system 1000. In some embodiments, host computer system 1100 may operate with the one or more devices of computer system 1000 to generate and provide data, to acquire data, to analyze data. For example, computer system may communicatively couple to and control one or more devices 1202, processes 1204, or the like. In some embodiments, devices 1201 may include universal serial bus (USB) devices. Host computer system 1100 may operate with the one or more devices in communication with device 1202 or process 1204 to perform an automation function, such as MMI (Man Machine Interface), SCADA (Supervisory Control and Data Acquisition), portable or distributed data acquisition, process control, advanced analysis, or other data acquisition and control functions. For example, computer system 100 may be used to implement data acquisition and control applications, test and measurement applications, image acquisition and processing application, machine vision processing applications, process control applications, man-machine interface applications, simulation applications, hardware-in-the-loop validation applications, motion control applications, computer based instruments (CBI) applications, signal conditioning (SCXI) applications, or the like. One or more of the instruments/devices of computer system 100 may include a programmable hardware element, using an FPGA or a processor and memory, and/or one or more portions of user code.

Computer system 1000 may include a variety of devices. For example, computer system 1000 may include modular instrumentation devices, such test and measurement devices manufactured by National Instruments Corporation, headquartered in Austin, Tex. In some embodiments, computer system 1000 may include computer based instrumentation (CBI) 1206, such as a digital multi-meter (DMM), an oscilloscope (SCOPE), a radio-frequency (RF) device (e.g., up-converter or down-converter), an arbitrary waveform generator (ARB), or the like. Computer system 1000 may include general purpose interface bus (GPIB) device 1208, such as a modular GPIB card used to communicate with a GPIB device 1210 (e.g., an oscilloscope) via a GPIB communication protocol. Computer system 1000 may include a serial device 1212, such as a modular serial card used to communicate with a serial device 1214 (e.g., an oscilloscope) via a serial communication protocol. Computer system 1000 may include a (PXI) device 1216, such as a PXI chassis having PXI form factor modular devices (e.g., modules) installed therein. Computer system 1000 may include a (VXI/VME) device 1218, such as a VXI/VME chassis having VXI/VME form factor modular devices (e.g., VXI/VME controllers/modules) installed therein. Computer system 1000 may include data acquisition (DAQ) device 1220, such as modular instrumentation including data input/output (I/O) interfaces for receiving, transmitting, conditioning, and/or processing signals (e.g., digital and analog signals). Computer system 1000 may include signal conditioning (SCXI) devices 1222 that can be used to condition and/or route signals, such as I/O signals as those transmitted/received at DAQ device 1220. SCXI device 1222 may include a chassis 1224 having devices 1222 installed therein (e.g., a relay/switch module having a relay/switch matrix). Computer system 1000 may include a programmable logic controller (PLC) 1226, such as a PLC used for the automation of electromechanical process. Computer system 1000 may include a distributed I/O module, such as a fieldpoint module 1228. Computer system 1000 may include a distributed control module, such as a fieldbus module 1230. Computer system 1000 may include an image acquisition (IMAQ) system, such as a modular IMAQ module 1232 and an associated IMAQ device (e.g., camera) 1234. Computer system 1000 may include a motion control system, such as a modular motion controller device 1236, a motor drive 1238, and a motor 1240. Computer system 100 may include any variety of other devices. Although some of the devices are illustrated in association with a chassis (e.g., modules) and some are illustrated independent from a chassis (e.g., card or standalone devices), embodiments may include all or some of the described device being provided in a module form factor to be housed in a chassis and/or a card form factor be installed in computer 1100. For example, PXI device 1216 may include a PXI chassis housing any combination of modular CBI devices, GPIB devices, serial devices, SCXI devices, DAQ devices, IMAQ devices, motion devices, or the like. For example a PXI form factor NI-5665 modular RF vector signal analyzer NI-5603 including a PXI form factor modular wideband RF downconverter module, a PXI form factor NI-5622 modular intermediate frequency (IF) digitizer module and/or a PXI form factor NI-5653 modular synthesizer/local oscillator (LO) source, may be provided a PXI chassis.

In some embodiments, the modules (e.g., downconverter system and/or the digitizer system) may be configured to operate under the control of a software driver which executes on a host computer. The method 200 (of any subset of the steps thereof) may be performed under such control, e.g., by means of instructions sent from the software driver to the downconverter system and/or the digitizer system. In some embodiments, the software driver may be configured to compute the equalization filter based on information provided by the modules, e.g., based on the digitized samples, and to provide the equalization filter to downconverter system for use in equalizing subsequently-received RF signals.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to. As used herein, the singular forms "a", "an" and "the" include plural referents unless the content clearly indicates otherwise. Thus, for example, reference to "a device" includes a combination of two or more devices.

We claim:

1. A method comprising:
receiving, at a receiver system, a modulated carrier signal, wherein the carrier signal is modulated using a reference signal, and wherein an acquisition by a digitizer is synced to the reference signal such that the modulated carrier signal has known timing with respect to a start of an acquisition within the digitizer, wherein the receiver system comprises an onboard signal source, the method further comprising generating the modulated carrier signal by modulating a signal provided from the onboard signal source of the receiver system;
routing the modulated carrier signal through the receiver system to generate a processed signal;
receiving the processed signal at the digitizer;
digitizing the processed signal at the digitizer; and
determining a delay of the modulated carrier signal routed through the receiver system based on the timing of the processed signal.

2. The method of claim 1, wherein the reference signal is generated by the digitizer.

3. The method of claim 1, wherein determining a delay of the modulated carrier signal comprises analyzing digitized data generated by digitizing the processed signal at the digitizer, and determining the timing offset of the processed signal with respect to the start of data acquisition at the digitizer.

4. The method of claim 1, further comprising modulating the carrier signal across a plurality of frequencies across an analysis bandwidth of the downconverter such that receiving, routing, receiving, digitizing and determining a delay are repeated for a plurality of frequencies across an analysis bandwidth of the receiver system.

5. The method of claim 4, further comprising determining delay vs. frequency data based on the determined delay, and generating an equalization filter based on the delay vs. frequency data.

6. The method of claim 5, further comprising:
receiving a radio-frequency (RF) signal from a source external to the receiver system;
routing the RF signal through the receiver device to generate a processed RF signal;
routing the processed RF signal to the digitizer;
receiving the processed RF signal at the digitizer; and
digitizing the processed RF signal at the digitizer, wherein digitizing the processed RF signal comprises applying the equalization filter to account for the delay of the receiver system including the receiver device.

7. The method of claim 1, wherein the receiver system comprises a downconverter, and wherein routing the modulated carrier signal through the receiver system to generate a processed signal comprises routing the modulated carrier signal through the downconverter to generate a processed signal that is a downconversion of the modulated carrier signal.

8. The method of claim 7, wherein a reference clock of the digitizer is used to activate modulation write operations to eliminate jitter in the generation of amplitude modulation (AM) modulation pulses inside the downconverter.

9. A system, comprising:
a receiver system configured to:
receive a modulated a carrier signal, wherein the carrier signal is modulated using a reference signal, and wherein an acquisition by a digitizer is synced to the reference signal such that the modulated carrier signal has known timing with respect to a start of an acquisition within the digitizer, wherein the receiver system comprises an onboard signal source, and wherein the receiver system is configured to generate the modulated carrier signal by modulating a signal provided from the onboard signal source; and
route the modulated carrier signal through the receiver system to generate a processed signal; and
the digitizer, configured to:
receive the processed signal;
digitize the processed signal; and
determine a delay of the modulated carrier signal routed through the receiver system based on the timing of the processed signal.

10. The system of claim 9, wherein the digitizer is configured to generate the reference signal.

11. The system of claim 9, wherein determining a delay of the modulated carrier signal comprises analyzing digitized data generated by digitizing the processed signal at the digitizer, and determining the timing of fset of the processed signal with respect to the start of data acquisition at the digitizer.

12. The system of claim 9, wherein the carrier signal is modulated across a plurality of frequencies across an analysis bandwidth of the downconverter such that modulating, routing, receiving, digitizing and determining a delay are repeated for a plurality of frequencies across the analysis bandwidth of the downconverter.

13. The system of claim 12, wherein the determined delays are used to determine delay vs. frequency data, and wherein the system is configured to generate an equalization filter based on the delay vs. frequency data.

14. The system of claim 13,
wherein the receiver system is further configured to:
receive a radio-frequency (RF) signal form a source external to the receiver system;
route the RF signal through the receiver system to generate a processed RF signal; and
wherein the digitizer is further configured to:
receive the processed RF signal at the digitizer; and
digitize the processed RF signal, wherein digitizing the processed RF signal comprises applying the equalization filter to account for the delay of the receiver system.

15. The system of claim 9, wherein the receiver system comprises a downconverter, and wherein routing the modulated carrier signal through the receiver system to generate a processed signal comprises routing the modulated carrier signal through the downconverter to generate a processed signal that is a downconversion of the modulated carrier signal.

16. The method of claim 15, wherein a reference clock of the digitizer is used to activate modulation write operations to eliminate jitter in the generation of amplitude modulation (AM) modulation pulses inside the downconverter.

17. A non-transitory computer readable storage medium comprising program instruction stored thereon, wherein the program instructions are executable by a computer to cause:
receiving, at a receiver system, a modulated carrier signal wherein the carrier signal is modulated using a reference signal, and wherein an acquisition by a digitizer is synced to the reference signal such that the modulated carrier signal has known timing with respect to the start of an acquisition within the digitizer, wherein the receiver system comprises an onboard signal source, and wherein the program instructions are further executable to cause generating the modulated carrier signal by modulating a signal provided from the onboard signal source of the receiver system;
routing the modulated carrier signal through the receiver system to generate a processed signal;
receiving the processed signal at the digitizer;
digitizing the processed signal at the digitizer; and
determining a delay of the modulated carrier signal routed through the receiver system based on the timing of the processed signal.

18. The non-transitory computer readable storage medium of claim 17, wherein the reference signal is generated by the digitizer.

19. The non-transitory computer readable storage medium of claim 17, wherein determining a delay of the modulated carrier signal comprises analyzing digitized data generated by digitizing the processed signal at the digitizer, and determining the timing offset of the processed signal with respect to the start of data acquisition at the digitizer.

20. The non-transitory computer readable storage medium of claim 17, wherein the program instructions are further executable to cause:
modulating the carrier signal across a plurality of frequencies across an analysis bandwidth of the downconverter such that execution of the program instructions causes the receiving, routing, receiving, digitizing and determining a delay to be repeated for a plurality of frequencies across an analysis bandwidth of the receiver system.

21. The non-transitory computer readable storage medium of claim 20, wherein execution of the program instructions causes generation of delay vs. frequency data based on the determined delay, and generation of an equalization filter based on the delay vs. frequency data.

22. The non-transitory computer readable storage medium of claim 21, wherein the program instructions are further executable to cause:
receiving a radio-frequency (RF) signal form a source external to the receiver system;
routing the RF signal through the receiver device to generate a processed RF signal;
routing the processed RF signal to the digitizer;
receiving the processed RF signal at the digitizer; and
digitizing the processed RF signal at the digitizer, wherein digitizing the processed RF signal comprises applying the equalization filter to account for the delay of the receiver system including the receiver device.

23. The non-transitory computer readable storage medium of claim 17, wherein the receiver system comprises a downconverter, and wherein routing the modulated carrier signal through the receiver system to generate a processed signal comprises routing the modulated carrier signal through the downconverter to generate a processed signal that is a downconversion of the modulated carrier signal.

24. The non-transitory computer readable storage medium of claim 23, wherein a reference clock of the digitizer is used to activate modulation write operations to eliminate jitter in the generation of amplitude modulation (AM) modulation pulses inside the downconverter.

25. A system, comprising:
a downconverter receiver system configured to:
modulate a carrier signal generated from an onboard signal source of the downconverter receiver system, wherein the carrier signal is modulated using a reference signal provided from a digitizer such that the modulated carrier signal has known timing with respect to the start of an acquisition within the digitizer; and
route the modulated carrier signal through a receiver device of the downconverter receiver system to generate a processed signal;
wherein the digitizer is configured to:
receive the processed signal;
digitize the processed signal; and
determine a delay of the modulated carrier signal routed through the downconverter receiver system based on the timing of the processed signal.

26. A system, comprising:
a digitizer configured to:
provide a reference signal to a downconverter receiver system, wherein the downconverter receiver system is configured to:
modulate a carrier signal generated from an onboard signal source of the downconverter receiver system, wherein the carrier signal is modulated using the reference signal provided from the digitizer such that the modulated carrier signal has known timing with respect to the start of an acquisition within the digitizer; and
route the modulated carrier signal through a receiver device of the downconverter receiver system to generate a processed signal;
receive the processed signal;
digitize the processed signal; and
determine a delay of the modulated carrier signal routed through the downconverter receiver system based on the timing of the processed signal.

27. A method comprising:
receiving, at a receiver system, a modulated carrier signal, wherein the carrier signal is modulated using a reference signal, and wherein an acquisition by a digitizer is synced to the reference signal such that the modulated carrier signal has known timing with respect to a start of an acquisition within the digitizer;
routing the modulated carrier signal through the receiver system to generate a processed signal;
receiving the processed signal at the digitizer;
digitizing the processed signal at the digitizer;
determining a delay of the modulated carrier signal routed through the receiver system based on the timing of the processed signal; and
wherein the carrier signal is modulated across a plurality of frequencies across an analysis bandwidth of a downconverter such that said receiving the modulated carrier signal, said routing, said receiving the processed signal, said digitizing, and said determining a delay are repeated for a plurality of frequencies across an analysis bandwidth of the receiver system.

28. The method of claim 27, wherein the receiver system comprises an onboard signal source, and further comprising generating the modulated carrier signal by modulating a signal provided from the onboard signal source of the receiver system.

29. The method of claim 27, wherein the reference signal is generated by the digitizer.

30. The method of claim 27, wherein determining a delay of the modulated carrier signal comprises analyzing digitized data generated by digitizing the processed signal at the digitizer, and determining the timing offset of the processed signal with respect to the start of data acquisition at the digitizer.

31. The method of claim 27, further comprising determining delay vs. frequency data based on the determined delay, and generating an equalization filter based on the delay vs. frequency data.

32. The method of claim 31, further comprising:
receiving a radio-frequency (RF) signal from a source external to the receiver system;
routing the RF signal through the receiver device to generate a processed RF signal;
routing the processed RF signal to the digitizer;
receiving the processed RF signal at the digitizer; and
digitizing the processed RF signal at the digitizer, wherein digitizing the processed RF signal comprises applying the equalization filter to account for the delay of the receiver system including the receiver device.

33. The method of claim 27, wherein the receiver system comprises the downconverter, and wherein said routing the modulated carrier signal through the receiver system to generate a processed signal comprises routing the modulated carrier signal through the downconverter to generate a processed signal that is a downconversion of the modulated carrier signal.

34. The method of claim 33, wherein a reference clock of the digitizer is used to activate modulation write operations to eliminate jitter in the generation of amplitude modulation (AM) modulation pulses inside the downconverter.

35. A system, comprising:
a receiver system configured to:
modulate a carrier signal using a reference signal, thereby generating a modulated carrier signal;
receive the modulated a carrier signal, and wherein an acquisition by a digitizer is synced to the reference signal such that the modulated carrier signal has known timing with respect to a start of an acquisition within the digitizer; and
route the modulated carrier signal through the receiver system to generate a processed signal; and
the digitizer, configured to:
receive the processed signal;
digitize the processed signal; and
determine a delay of the modulated carrier signal routed through the receiver system based on the timing of the processed signal;
wherein the carrier signal is modulated across a plurality of frequencies across an analysis bandwidth of a downconverter such that modulating, routing, receiving, digitizing and determining a delay are repeated for a plurality of frequencies across the analysis bandwidth of the downconverter.

36. The system of claim 35, wherein the receiver system comprises an onboard signal source and wherein the receiver system is configured to generate the modulated carrier signal by modulating a signal provided from the onboard signal source.

37. The system of claim 35, wherein the digitizer is configured to generate the reference signal.

38. The system of claim 35, wherein determining a delay of the modulated carrier signal comprises analyzing digitized data generated by digitizing the processed signal at the digitizer, and determining the timing offset of the processed signal with respect to the start of data acquisition at the digitizer.

39. The system of claim 35, wherein the determined delays are used to determine delay vs. frequency data, and wherein the system is configured to generate an equalization filter based on the delay vs. frequency data.

40. The system of claim 39,
wherein the receiver system is further configured to:
receive a radio-frequency (RF) signal form a source external to the receiver system;
route the RF signal through the receiver system to generate a processed RF signal; and
wherein the digitizer is further configured to:
receive the processed RF signal at the digitizer; and
digitize the processed RF signal, wherein digitizing the processed RF signal comprises applying the equalization filter to account for the delay of the receiver system.

41. The system of claim 35, wherein the receiver system comprises the downconverter, and wherein routing the modulated carrier signal through the receiver system to generate a processed signal comprises routing the modulated carrier signal through the downconverter to generate a processed signal that is a downconversion of the modulated carrier signal.

42. The method of claim 41, wherein a reference clock of the digitizer is used to activate modulation write operations to eliminate jitter in the generation of amplitude modulation (AM) modulation pulses inside the downconverter.

43. A non-transitory computer readable storage medium comprising program instruction stored thereon, wherein the program instructions are executable by a computer to cause:
receiving, at a receiver system, a modulated carrier signal wherein the carrier signal is modulated using a reference signal, and wherein an acquisition by a digitizer is synced to the reference signal such that the modulated carrier signal has known timing with respect to the start of an acquisition within the digitizer;
routing the modulated carrier signal through the receiver system to generate a processed signal;
receiving the processed signal at the digitizer;
digitizing the processed signal at the digitizer;
determining a delay of the modulated carrier signal routed through the receiver system based on the timing of the processed signal; and
wherein the carrier signal is modulated across a plurality of frequencies across an analysis bandwidth of a downconverter such that execution of the program instructions causes the receiving, routing, receiving, digitizing and determining a delay to be repeated for a plurality of frequencies across an analysis bandwidth of the receiver system.

44. The non-transitory computer readable storage medium of claim 43, wherein the receiver system comprises an onboard signal source, wherein the program instructions are further executable to cause:
generating the modulated carrier signal by modulating a signal provided from the onboard signal source of the receiver system.

45. The non-transitory computer readable storage medium of claim 43, wherein the reference signal is generated by the digitizer.

46. The non-transitory computer readable storage medium of claim 43, wherein determining a delay of the modulated carrier signal comprises analyzing digitized data generated by digitizing the processed signal at the digitizer, and determining the timing offset of the processed signal with respect to the start of data acquisition at the digitizer.

47. The non-transitory computer readable storage medium of claim 43, wherein execution of the program instructions causes generation of delay vs. frequency data based on the determined delay, and generation of an equalization filter based on the delay vs. frequency data.

48. The non-transitory computer readable storage medium of claim 47, wherein the program instructions are further executable to cause:
receiving a radio-frequency (RF) signal from a source external to the receiver system;

routing the RF signal through the receiver device to generate a processed RF signal;
routing the processed RF signal to the digitizer;
receiving the processed RF signal at the digitizer; and
digitizing the processed RF signal at the digitizer, wherein digitizing the processed RF signal comprises applying the equalization filter to account for the delay of the receiver system including the receiver device.

49. The non-transitory computer readable storage medium of claim 43, wherein the receiver system comprises the downconverter, and wherein said routing the modulated carrier signal through the receiver system to generate a processed signal comprises routing the modulated carrier signal through the downconverter to generate a processed signal that is a downconversion of the modulated carrier signal.

50. The non-transitory computer readable storage medium of claim 49, wherein a reference clock of the digitizer is used to activate modulation write operations to eliminate jitter in the generation of amplitude modulation (AM) modulation pulses inside the downconverter.

51. A method comprising:
receiving, at a receiver system, a modulated carrier signal, wherein the carrier signal is modulated using a reference signal, and wherein an acquisition by a digitizer is synced to the reference signal such that the modulated carrier signal has known timing with respect to a start of an acquisition within the digitizer;
routing the modulated carrier signal through the receiver system to generate a processed signal, wherein the receiver system comprises a downconverter, and wherein said routing the modulated carrier signal through the receiver system to generate a processed signal comprises routing the modulated carrier signal through the downconverter to generate a processed signal that is a downconversion of the modulated carrier signal;
receiving the processed signal at the digitizer;
digitizing the processed signal at the digitizer; and
determining a delay of the modulated carrier signal routed through the receiver system based on the timing of the processed signal.

52. The method of claim 51, wherein the receiver system comprises an onboard signal source, and further comprising generating the modulated carrier signal by modulating a signal provided from the onboard signal source of the receiver system.

53. The method of claim 51, wherein the reference signal is generated by the digitizer.

54. The method of claim 51, wherein determining a delay of the modulated carrier signal comprises analyzing digitized data generated by digitizing the processed signal at the digitizer, and determining the timing offset of the processed signal with respect to the start of data acquisition at the digitizer.

55. The method of claim 51, further comprising modulating the carrier signal across a plurality of frequencies across an analysis bandwidth of the downconverter such that receiving, routing, receiving, digitizing and determining a delay are repeated for a plurality of frequencies across an analysis bandwidth of the receiver system.

56. The method of claim 55, further comprising determining delay vs. frequency data based on the determined delay, and generating an equalization filter based on the delay vs. frequency data.

57. The method of claim 56, further comprising:
receiving a radio-frequency (RF) signal from a source external to the receiver system;
routing the RF signal through the receiver device to generate a processed RF signal;
routing the processed RF signal to the digitizer;
receiving the processed RF signal at the digitizer; and
digitizing the processed RF signal at the digitizer, wherein digitizing the processed RF signal comprises applying the equalization filter to account for the delay of the receiver system including the receiver device.

58. The method of claim 51, wherein a reference clock of the digitizer is used to activate modulation write operations to eliminate jitter in the generation of amplitude modulation (AM) modulation pulses inside the downconverter.

59. A system, comprising:
a receiver system configured to:
receive a modulated a carrier signal, wherein the carrier signal is modulated using a reference signal, and wherein an acquisition by a digitizer is synced to the reference signal such that the modulated carrier signal has known timing with respect to a start of an acquisition within the digitizer; and
route the modulated carrier signal through the receiver system to generate a processed signal, wherein the receiver system comprises a downconverter, and wherein to route the modulated carrier signal through the receiver system to generate a processed signal, the receiver system is configured to route the modulated carrier signal through the downconverter to generate a processed signal that is a downconversion of the modulated carrier signal; and
the digitizer, configured to:
receive the processed signal;
digitize the processed signal; and
determine a delay of the modulated carrier signal routed through the receiver system based on the timing of the processed signal.

60. The system of claim 59, wherein the receiver system comprises an onboard signal source and wherein the receiver system is configured to generate the modulated carrier signal by modulating a signal provided from the onboard signal source.

61. The system of claim 59, wherein the digitizer is configured to generate the reference signal.

62. The system of claim 59, wherein determining a delay of the modulated carrier signal comprises analyzing digitized data generated by digitizing the processed signal at the digitizer, and determining the timing offset of the processed signal with respect to the start of data acquisition at the digitizer.

63. The system of claim 59, wherein the carrier signal is modulated across a plurality of frequencies across an analysis bandwidth of the downconverter such that modulating, routing, receiving, digitizing and determining a delay are repeated for a plurality of frequencies across the analysis bandwidth of the downconverter.

64. The system of claim 63, wherein the determined delays are used to determine delay vs. frequency data, and wherein the system is configured to generate an equalization filter based on the delay vs. frequency data.

65. The system of claim 64,
wherein the receiver system is further configured to:
receive a radio-frequency (RF) signal form a source external to the receiver system;
route the RF signal through the receiver system to generate a processed RF signal; and
wherein the digitizer is further configured to:
receive the processed RF signal at the digitizer; and digitize the processed RF signal, wherein digitizing the processed RF signal comprises applying the equalization filter to account for the delay of the receiver system.

66. The method of claim 59, wherein a reference clock of the digitizer is used to activate modulation write operations to eliminate jitter in the generation of amplitude modulation (AM) modulation pulses inside the downconverter.

67. A non-transitory computer readable storage medium comprising program instruction stored thereon, wherein the program instructions are executable by a computer to cause:
   receiving, at a receiver system, a modulated carrier signal wherein the carrier signal is modulated using a reference signal, and wherein an acquisition by a digitizer is synced to the reference signal such that the modulated carrier signal has known timing with respect to the start of an acquisition within the digitizer, wherein the receiver system comprises a downconverter, and wherein said routing the modulated carrier signal through the receiver system to generate a processed signal comprises routing the modulated carrier signal through the downconverter to generate a processed signal that is a downconversion of the modulated carrier signal;
   routing the modulated carrier signal through the receiver system to generate a processed signal;
   receiving the processed signal at the digitizer;
   digitizing the processed signal at the digitizer; and
   determining a delay of the modulated carrier signal routed through the receiver system based on the timing of the processed signal.

68. The non-transitory computer readable storage medium of claim 67, wherein the receiver system comprises an onboard signal source, and further comprising generating the modulated carrier signal by modulating a signal provided from the onboard signal source of the receiver system.

69. The non-transitory computer readable storage medium of claim 67, wherein the reference signal is generated by the digitizer.

70. The non-transitory computer readable storage medium of claim 67, wherein determining a delay of the modulated carrier signal comprises analyzing digitized data generated by digitizing the processed signal at the digitizer, and determining the timing offset of the processed signal with respect to the start of data acquisition at the digitizer.

71. The non-transitory computer readable storage medium of claim 67, further comprising modulating the carrier signal across a plurality of frequencies across an analysis bandwidth of the downconverter such that execution of the program instructions causes the receiving, routing, receiving, digitizing and determining a delay to be repeated for a plurality of frequencies across an analysis bandwidth of the receiver system.

72. The non-transitory computer readable storage medium of claim 71, wherein execution of the program instructions causes generation of delay vs. frequency data based on the determined delay, and generation of an equalization filter based on the delay vs. frequency data.

73. The non-transitory computer readable storage medium of claim 72, further comprising:
   receiving a radio-frequency (RF) signal form a source external to the receiver system;
   routing the RF signal through the receiver device to generate a processed RF signal;
   routing the processed RF signal to the digitizer;
   receiving the processed RF signal at the digitizer; and
   digitizing the processed RF signal at the digitizer, wherein digitizing the processed RF signal comprises applying the equalization filter to account for the delay of the receiver system including the receiver device.

74. The non-transitory computer readable storage medium of claim 67, wherein a reference clock of the digitizer is used to activate modulation write operations to eliminate jitter in the generation of amplitude modulation (AM) modulation pulses inside the downconverter.

* * * * *

UNITED STATES PATENT AND TRADEMARK OFFICE
CERTIFICATE OF CORRECTION

PATENT NO. : 8,514,978 B2  Page 1 of 1
APPLICATION NO. : 12/976638
DATED : August 20, 2013
INVENTOR(S) : Wertz et al.

It is certified that error appears in the above-identified patent and that said Letters Patent is hereby corrected as shown below:

In the Claims:

Claim 14, Column 14, Line 35, please delete "form" and substitute -- from --;
Claim 22, Column 15, Line 37, please delete "form" and substitute -- from --;
Claim 40, Column 17, Line 64, please delete "form" and substitute -- from --;
Claim 65, Column 20, Line 62, please delete "form" and substitute -- from --; and
Claim 73, Column 22, Line 23, please delete "form" and substitute -- from --.

Signed and Sealed this
Twenty-second Day of October, 2013

Teresa Stanek Rea
*Deputy Director of the United States Patent and Trademark Office*